Sept. 17, 1946. W. O. BENNETT, JR 2,407,945
APPARATUS FOR TESTING WATERPROOF WATCHCASES
Original Filed Nov. 1, 1943 2 Sheets-Sheet 2

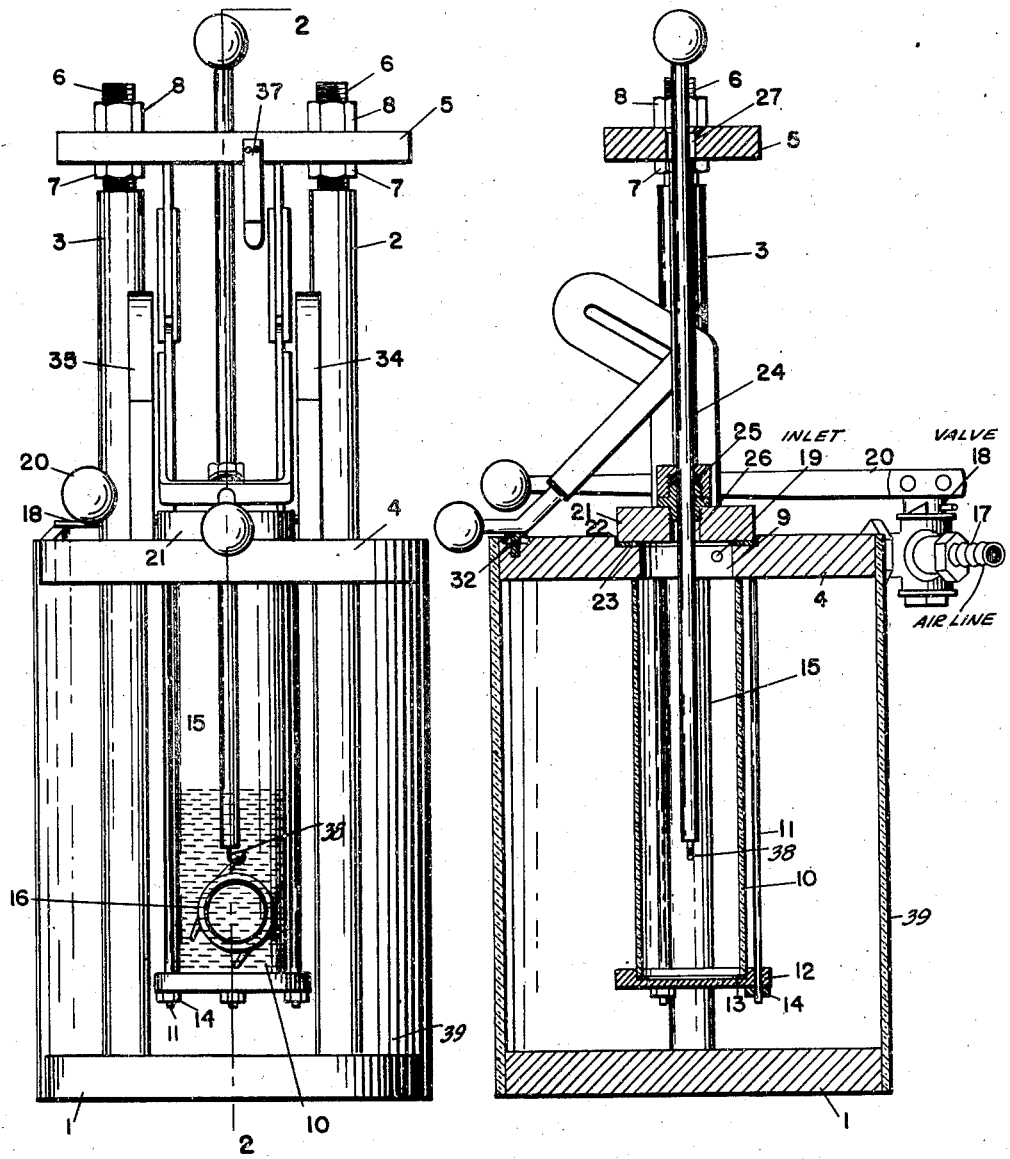

INVENTOR.
WILLIAM O. BENNETT, JR.
BY James M. Heitman
Atty.

Patented Sept. 17, 1946

2,407,945

UNITED STATES PATENT OFFICE 2,407,945

APPARATUS FOR TESTING WATERPROOF WATCHCASES

William Ogle Bennett, Jr., Lancaster Township, Lancaster County, Pa., assignor to Hamilton Watch Company, Lancaster, Pa.

Substitute for abandoned application November 1, 1943, Serial No. 508,538. Divided and this application February 14, 1946, Serial No. 647,566

3 Claims. (Cl. 73—40)

This invention relates to an improvement in an apparatus for testing water proof watch cases.

The object of the present invention is to provide an apparatus by means of which watch cases may be tested for water proof qualities.

The trend in the present day wrist watches for men is toward a water proof case. It has heretofore been difficult to make such a case, partly because of the packing necessary around the stem and partly because of the difficulties arising in the testing of the watch at the factory in which it is made. It is with this latter difficulty that the present invention deals. Heretofore, in the testing of timepieces, a watch which was found not to be water proof or fluid tight admitted water during the testing procedure and the entire movement had to be disassembled, dried, cleaned, oiled, and reassembled. It was this step in the testing which made the price of water proof watches prohibitive inasmuch as approximately one-half of the watches tested would be found to be not fluid tight. The present invention is directed to an apparatus by means of which fluid tight casings containing watch movements may be tested under water without admitting water to the movement and eliminating the necessity of rejecting the watches with the consequent disassembling of the movement and inserting a new gasket or new packing. It is well known that the slightest bit of rust or moisture in the movement of the watch will seriously interfere with its timekeeping qualities and frequently cause the watch to stop.

It is the purpose of the present invention to provide an apparatus which will subject watch casings to a test for fluid tightness without admitting water to the interior of said casing should they not be fluid tight.

It is a further object of the present invention to provide means for subjecting a watch case while under water to a reduced pressure, thus permitting the normal pressure within the watch case to indicate any leakage in the casing.

It is a still further object of the present invention to provide a means which breaks the partial vacuum and at the same time removes the watch from the moisture laden air.

It is a still further object of the present invention to provide an apparatus which may be used either above atmospheric pressure or below atmospheric pressure.

It is a still further object of the present invention to provide an apparatus which is operated by a control lever so arranged that the breaking of the sealing medium either of the increased or reduced pressure type at the same time removes the watch from the testing position.

The invention is illustrated in the accompanying drawings in which:

Fig. 1 is a front elevation showing a watch case in the testing position.

Fig. 2 is a section on line 2—2 of Fig. 1.

Figure 3:
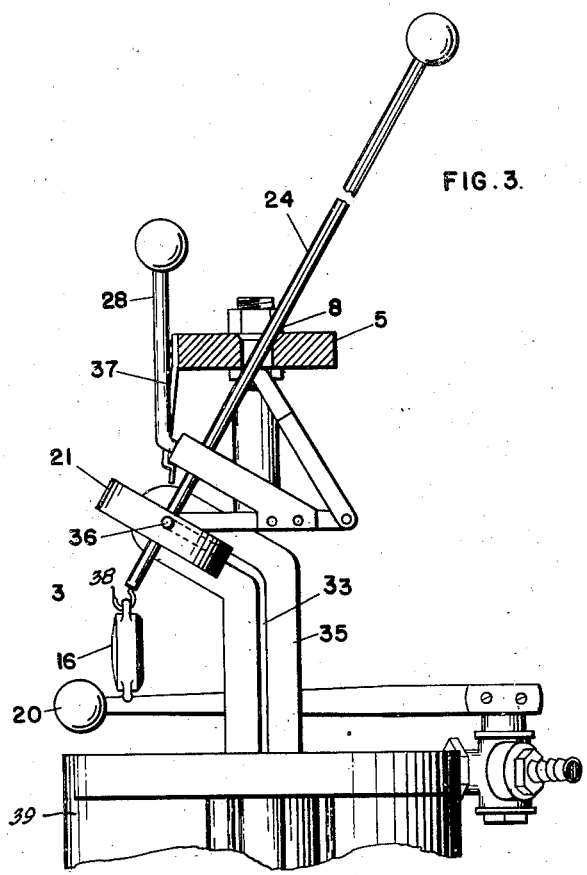
Fig. 3 is a broken side elevation partly in section showing the sealing plate in open position.
Figure 4:
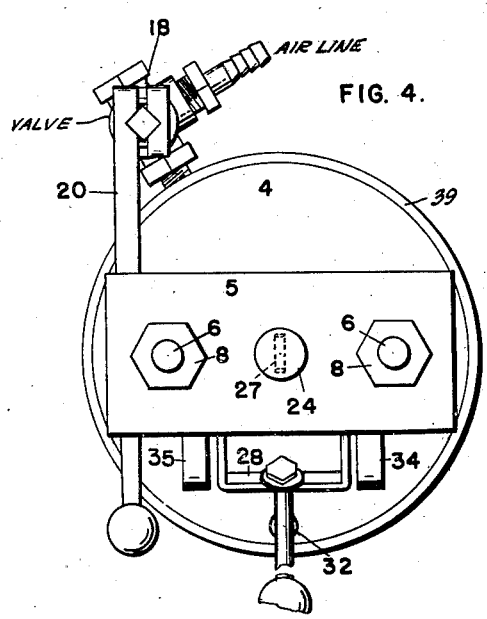
Fig. 4 is a top plan view of the apparatus.

In the drawings the apparatus is shown supported on a lower base 1 carrying uprights 2 and 3 which support a top base 4 and an upper guide plate 5. The distance between the upper base 4 and the guide plate 5 is very accurately determined by means of the threaded extensions 6 of the uprights 2 and 3 and the nuts 7 and 8. The extreme accuracy of this distance between the guiding plate 5 and the upper base 4 is necessary because of the method of sealing the opening 9 in the upper base 4, which method will be described hereinafter.

A glass cylinder 10 centrally located of the apparatus extends downward from the opening 9 and is held in sealing relation against the upper base 4 by means of the rods 11 passing through the lower plate 12. A gasket 13 forms the sealing medium when the nuts 14 holding the cylinder plate 12 are tightened. Thus the glass cylinder 10 provides a chamber 15 which should be partially filled with water and which is used as a testing chamber for a watch case 16.

An air line not shown is connected to an inlet 17 forming part of a three-way valve 18 and connected to the chamber 15 through the base 4 and the opening 19. A handle 20 controls the valve and either admits air under pressure or, by means of an exhaust pump, reduces the pressure in the chamber 15.

Figure 5:
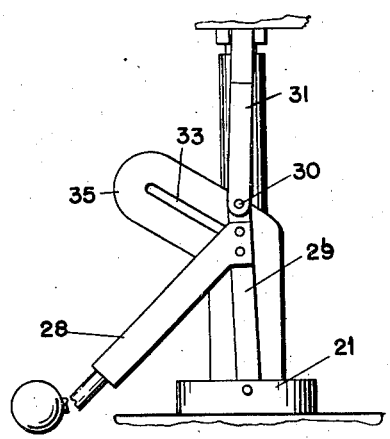
Fig. 5 is a detailed view showing the lock for the sealing means slightly exaggerated.

The upper opening of the chamber 15 is sealed by means of a sealing plate 21 which fits a depression 22 formed in the top side of the upper base 4 carrying a sealing washer 23. A rod 24, slidably mounted in a bushing 25, passes through an opening 26 in the sealing plate 21 and extends into the chamber 15. The upper end of the rod 24 passes through a slot 27 in the guiding plate 5 which guides the rod 24 both in vertical movement and in a certain limited angular movement. Referring to Fig. 5, the sealing plate 21 is connected to a handle 28 through a link 29 which is pivoted at 30 to a second link 31 mounted in the guiding plate 5. The pressure necessary for sealing the opening 9 is derived by moving the handle 28 so that the pivot point 30 is carried slightly beyond the vertical position which will maintain pressure on the resilient washer 23. An adjustable stop 32, contacting the handle 28, limits the motion of the linkage past the vertical position. The sealing plate 21, upon release from the sealing position, because of extending pins 36 will follow the grooves 33 in the guideways 34 and 35. These guideways are securely fixed to the uprights 2 and 3. A spring strip 37 fixed to the upper guide plate 5 receives the forward edge of the handle member 28 and holds it in open position.

Arranged between the upper and lower base is a transparent plastic cylinder 39 which serves as a protective screen for the operator.

In the operation of the device a cased watch 16 is hung on the end of a hook 38 on the rod 24 as shown in Fig. 3. Downward movement of the handle 28 swings the watch down through the opening 9 and into the chamber 15, the sealing plate following the groove 33 in the guideways 34 and 35. Final downward pressure of the handle against the stop 32 compresses the resilient washer 23 and swings the linkage to position as shown in Fig. 5, thus thoroughly sealing the opening 9 and the chamber 15 which has been partially filled with water as shown in Fig. 1. The pressure of the air above the water is reduced by means of an exhaust pump through the opening 19 and the valve 18. Should there be any leaks in the watch case, this reduction of pressure or creation of a vacuum will cause air trapped in the watch case to arise and bubble through the water.

After the watch is tested, it is possible for the operator to lift the watch out of the water by vertical movement of the rod 24 and release the partial vacuum through the three-way valve. With a single movement of the handle 28 the seal at the opening 9 will be broken and at the same time the watch will be swung out of the chamber 15 and into the open air. This quick movement of the watch out of the chamber 15 immediately upon breaking of the seal, permits the watch to be withdrawn before the moist air, which is necessarily present in the chamber 15, can enter the interior of the casing except in minute quantities. It is then possible to place the watch in a drying chamber, that is, such watches as were found to be not fluid tight, and in a period of 24 hours completely dry the minute quantities of moisture in the watch movements, thus insuring against any rusting of the watch parts. This eliminates the necessity of disassembling the watch, and cleaning and drying the individual parts, oiling and reassembling the watch, which operation is one of the main costs of the completed timepiece.

Using the same apparatus, it is possible to use a pressure above atmospheric rather than a reduced pressure. The operation, using increased pressure is as follows. The watch is lowered into the central glass cylinder and held above the water level. By means of the air line the pressure above the water is increased through the valve 18 and the watch allowed to remain in the atmosphere of increased pressure until the pressure within the watch case has also increased. The watch is then lowered into the water and the pressure of the air above the water and within the cylinder is allowed to return to normal through manipulation of handle 20. The liberated air from the watch case will show as bubbles in the water. With this method, it is possible to test watches with the least chance of moisture entering the cases of those watch cases which leak water, and the cases may be made waterproof without the necessity of disassembling; it being only necessary to dry the watches in a drying chamber for about twenty-four hours.

What is claimed is:

1. An apparatus for testing watch cases comprising a lower base, uprights extending upward from said base, an upper base formed with a central opening and supported by said uprights, an upper guiding plate supported by said uprights and above said upper base, means for varying the distance between said upper base and said upper guiding plate, a sealing plate for said upper base opening, a cylinder closed at one end and depending from said upper base opening, a link mechanism connected to said upper plate and said sealing plate, a handle connected with said link mechanism to swing said sealing plate from open to closed position, a resilient washer around said opening and contacted by said sealing plate, means limiting the motion of the handle to permit the link mechanism to move the sealing plate against and compress said resilient washer, said link mechanism passing beyond the straight line position to firmly lock said sealing plate in sealing position and means controlling the pressure within said cylinder.

2. An apparatus for testing watch cases comprising a lower base, uprights extending upward from said base, an upper base formed with a central opening and supported by said uprights, an upper guiding plate supported by said uprights and above said upper base, means for varying the distance between said upper base and said upper guiding plate, a sealing plate for said upper base opening, a cylinder closed at one end depending from said base opening, a link mechanism connected to said upper plate and said sealing plate, a handle connected with said link mechanism to swing said sealing plate from open to closed position, a resilient washer around said opening and contacted by said sealing plate, means limiting the motion of the handle to permit the link mechanism to move the sealing plate against and compress said resilient washer, said link mechanism passing beyond the straight line position to firmly lock said sealing plate in sealing position, a transparent shield extending between said lower base and said upper base, and means controlling the pressure within said cylinder.

3. An apparatus for testing watch cases comprising a lower base, a pair of uprights secured to said base, an upper base formed with a central opening supported directly above said lower base by said uprights, an upper guiding plate carried by said uprights and above said upper base, a testing chamber extending below and communicating with the central opening of said upper base, a sealing plate for said central opening, means connected to said guide plate for supporting said sealing plate in both open and closed position, a handle connected to said plate supporting means, guideways formed with grooves carried by said uprights between said upper base and said sealing plate, pins on said sealing plate engaging said grooves to limit the movement of said sealing plate, a watchcase supporting rod slidably mounted in said sealing plate, operation of the handle in one direction effecting movement of the sealing plate from open to closed position with simultaneous insertion of the sliding rod and supported watchcase into the testing chamber, and operation of the handle in the reverse direction effecting movement of the sealing plate from closed to open position with simultaneous removal of the rod and supported watchcase from the testing chamber.

WILLIAM OGLE BENNETT, Jr.